May 3, 1938.  G. J. MALHERBE  2,116,208
PROCESS OF REFINING
Filed May 28, 1936
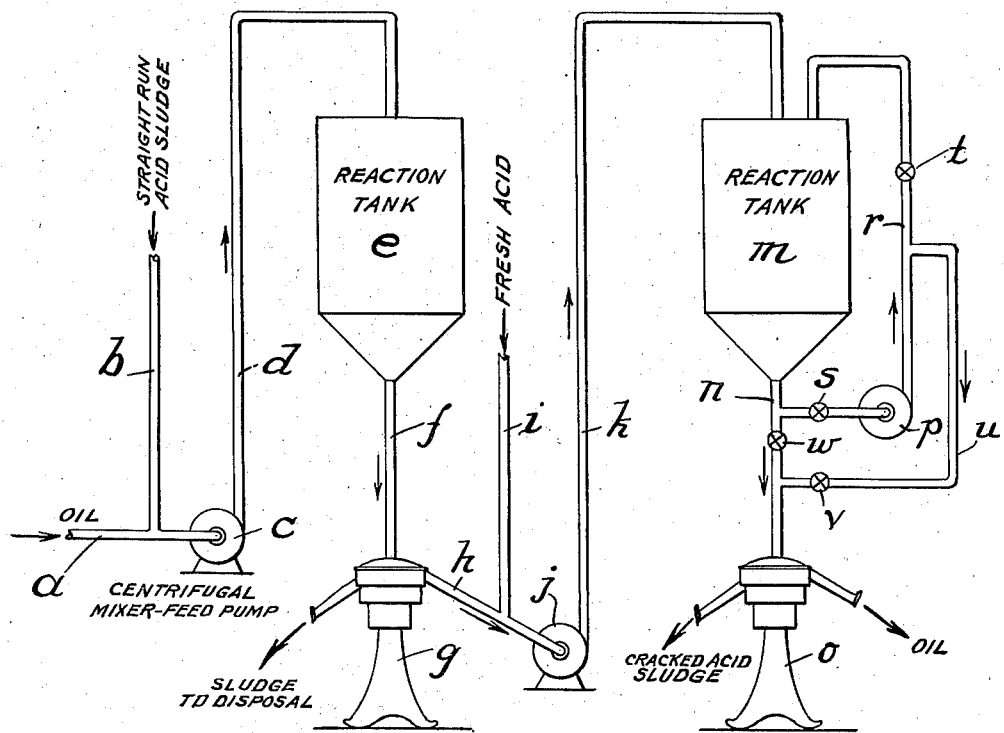
WITNESS:
INVENTOR
Gideon J. Malherbe
BY
ATTORNEYS.

Patented May 3, 1938

2,116,208

UNITED STATES PATENT OFFICE 2,116,208

PROCESS OF REFINING

Gideon J. Malherbe, Bronxville, N. Y., assignor to The De Laval Separator Company, New York, N. Y., a corporation of New Jersey Application May 28, 1936, Serial No. 82,192

6 Claims. (Cl. 196—40)

In the treatment of petroleum oils with sulfuric acid, and in analogous processes, it has been long well known to practice the process in stages, each stage comprising reacting the oil with sulfuric or other mineral acid and separating the oil from the products of reaction (acid sludge) either by settlement or centrifugation. It has also been long well known to practice the process by utilizing the acid sludge separated in one stage as the treating agent for the oil in the immediately preceding stage; in other words, to establish a flow of acid and acid sludge through the several stages in a direction the reverse of the direction of flow of the oil.

Both petroleum distillates and petroleum residues have been subjected to this treatment and such petroleum fractions have been the products of both straight run distillation and cracking. The acid sludge produced by the acid treatment of the products of straight run distillation is ordinarily designated as "straight run acid sludge". The acid sludge produced by acid treatment of the products of cracking is usually designated "cracked acid sludge". In the description that follows it is to be understood that these expressions are intended to have their specified ordinary meanings. These two sludges have quite different characteristics, the former, for example, being relatively deficient in sulfur compounds.

It is the object of my invention to effect substantial savings in the cost of practicing these known refining processes. My improved process is especially useful in those refineries in which both crudes or straight run distillates or residues, on the one hand, and cracked distillates or residues, on the other hand, are subjected to the acid purification treatment. The process involves the utilization of the acid sludge produced in treating one class of hydrocarbons in the treatment of the other class of hydrocarbons, thereby effecting a substantial saving in the cost of both treatments. More specifically the process involves the utilization of straight run acid sludge in the treatment of a cracked petroleum product, that is, a fraction, such as gasoline, produced by cracking the crude or any fraction thereof. The process is further characterized by a multi-stage treatment, one stage of which involves the utilization of straight run acid sludge while a subsequent stage involves treatment with fresh acid. The simplest embodiment of the invention embodies a two-stage treatment, one with straight run acid sludge and the other with fresh acid.

One important advantage of the process arises from the fact that cracked petroleum fractions contain a large percentage of sulfur compounds while straight run acid sludge is deficient in sulfur compounds and is therefore adapted to take up a large proportion of the sulfur compounds in the oil, being nearly as efficient in that respect as fresh acid. On the other hand, in the refinement of cracked hydrocarbons, the use, in one stage, of acid sludge that is a product of a later stage of the same multi-stage process offers no such advantage, since such sludge has little or no desulfurizing capacity.

My improved process can be best understood by describing one simple embodiment thereof as it is capable of being practiced in an apparatus of which the accompanying drawing is a diagram.

Petroleum, or more usually a distillate or residue thereof, that has been subjected to a cracking or decomposition process, or which has been fractionated from the product of such a process, flows through a pipe $a$ to a centrifugal mixer-feed pump $c$, to which also flows a regulated proportion of straight run acid sludge, the two being intimately mixed in the pump. The mixture thence flows through a pipe $d$ to a reaction tank $e$, in which it remains for the time required to complete the reaction. The duration of the reaction period varies greatly with the character of the oil being treated. From the reaction tank $e$ the mixture of oil and reaction products (acid sludge) flows through a pipe $f$ to a centrifuge $g$, wherein the acid sludge, now containing considerable sulfur compounds, is separated from the partly purified oil. The latter flows through a pipe $h$ to a centrifugal mixer-feed pump $j$, to which also flows, from a pipe $i$, a regulable proportion of fresh acid. In the pump the oil and acid are intimately mixed and conveyed through a pipe $k$ to a reaction tank $m$. From the reaction tank $m$ the mixture of oil and reaction products (acid sludge) is conveyed through a pipe $n$ to a centrifuge $o$, wherein the oil is separated from the sludge. In each stage the reaction period should be substantially over one minute.

The acid-treated oil may then be neutralized by treatment with caustic soda by any known procedure, following a water washing operation to reduce acidity or not as desired.

Between the two stages described may be interposed one or more other stages, wherein the oil may be treated with acid or acid sludge, but such intermediate treatment forms no part of my process and is not herein claimed and need not be herein described. In my process, however, it is not necessary, and is usually not desirable, to subject the oil to any acid purification treatment other than in the two stages described.

A pronounced advantage of my process is that the oil is treated with fresh acid after it is largely deprived of certain impurities including particularly sulfur compounds. This permits of the use of a smaller quantity of fresh acid, or acid of lower strength, than would otherwise be necessary. It will be understood, however, that the percentage and strength of fresh acid will vary with the character of the oil. From one-half to fifteen per cent. of 74% to 98% sulfuric acid defines the range of which will include treatments of most oils in the final stage of the process. In the first stage the average percentage of straight run acid sludge to oil will be about one per cent. of sludge having not less than a 50% acid value. The percentage of sludge to oil may, however, vary from about one to five per cent. The percentages given are illustrative only.

The mixture in either reaction tank need not remain quiescent. Mild, but not violent, stirring or agitation is often desirable. This may be effected by establishing an endless circulation through the tank. Such circulating means is shown in the drawing as applied to the second tank, but it may also be applied to the first tank. In this tank a pipe $r$ connects pipe $n$ with the top of tank $m$. A pump $p$ is interposed in pipe $r$, which is provided with valves $t$ and $s$. A branch pipe $u$, provided with a valve $v$, connects pipe $r$ (between pump $p$ and valve $t$) with the centrifuge feed pipe $n$. Pipe $n$ is provided with a valve $w$ between its outflow connection with pipe $r$ and its inflow connection with pipe $u$. Valve $w$ may be closed and valve $s$ opened, and by adusting valves $t$ and $v$ a predetermined proportion of the mixture from the tank may be returned to the tank and the remainder sent to the centrifuge.

A further feature of my process is that by using relatively weak acid in the first stage to remove undesirable sulphur compounds and by this method reducing both the quantity and the strength of acid used in subsequent stages, as well as limiting the reaction time, there will be less tendency for the unsaturated and therefore high anti-knock value material to be transformed, or what is commonly known in the industry as "polymerized". The net result of such a treatment is therefore that desirable sulphur reduction can be obtained without its attendant bad feature of reduction in anti-knock value of the treated product. These remarks apply particularly to the treatment of cracked gasoline.

What I claim and desire to protect by Letters Patent is:

1. The hereinbefore described process of purifying a cracked petroleum hydrocarbon oil which comprises intimately mixing and reacting with the oil a straight run sulfuric acid sludge to form a mixture of partially purified oil and cracked acid sludge, and separating the oil from the cracked acid sludge.

2. The hereinbefore described process of purifying a cracked petroleum hydrocarbon oil which comprises subjecting a flowing stream of oil to a multiple-stage refining treatment, one stage comprising mixing with the oil a straight run sulfuric acid sludge to form a mixture of partially purified oil and cracked acid sludge and separating the oil from the cracked acid sludge, and a later stage comprising mixing and reacting with the partly purified oil fresh sulfuric acid and separating the resultant mixture of purified oil and acid sludge.

3. The hereinbefore described process of purifying a cracked petroleum hydrocarbon oil which comprises effecting removal of a large proportion of contained sulfur compounds by intimately mixing the same with a straight run sulfuric acid sludge that is deficient in sulfur compounds, and separating the largely desulfurized oil from the cracked acid sludge, whereby the strength and quantity of the acid required for final purification and the time of reaction may be substantially reduced and the desirable sulfur reduction be obtained with less tendency to polymerization of unsaturated hydrocarbons.

4. The herein described process of purifying a cracked hydrocarbon oil which comprises subjecting a straight run hydrocarbon oil fraction to treatment with sulfuric acid and separating therefrom the resultant acid sludge, intimately mixing and reacting the cracked hydrocarbon oil with said sludge, and separating the acid sludge product of the last named treatment from the cracked oil.

5. The herein described process of purifying a cracked hydrocarbon oil which comprises subjecting a straight run hydrocarbon oil fraction to treatment with sulfuric acid and separating therefrom the resultant acid sludge, intimately mixing and reacting the cracked hydrocarbon oil with said sludge, separating the acid sludge product of the last named treatment from the cracked oil, and subsequently mixing and reacting with the partly purified cracked oil fresh sulfuric acid and separating the acid sludge of the last named treatment from the oil.

6. The hereinbefore described process of purifying a cracked petroleum hydrocarbon oil which comprises preliminarily removing certain impurities including particularly sulfur compounds by mixing and reacting with the cracked oil a straight run sulfuric acid sludge which is deficient in sulfur compounds to thereby take up a large proportion of the sulfur compounds in the cracked oil, separating the acid sludge product from the oil, and subsequently mixing with the partly purified oil sulfuric acid in amount and strength sufficient to take up substantially the remainder of the sulfur compounds and separating the acid sludge from the oil; thereby economically utilizing the straight run acid sludge, economizing in the use of acid, and reducing the tendency to impairment of anti-knock value.

GIDEON J. MALHERBE.